United States Patent [19]

Aldersley et al.

[11] Patent Number: 5,062,596
[45] Date of Patent: Nov. 5, 1991

[54] CONTROL APPARATUS

[75] Inventors: Alan Aldersley, Blackpool; Ronald Hayes, Preston, both of England

[73] Assignee: British Aerospace plc, London, England

[21] Appl. No.: 564,069

[22] Filed: Aug. 8, 1990

[30] Foreign Application Priority Data

Aug. 26, 1989 [GB] United Kingdom ............... 8919453

[51] Int. Cl.$^5$ ............................................ B64C 13/28
[52] U.S. Cl. ................................. 244/234; 244/230
[58] Field of Search ............... 244/80, 221, 230, 234, 244/191, 223; 212/191, 195, 197

[56] References Cited

U.S. PATENT DOCUMENTS

| | | | |
|---|---|---|---|
| 2,207,387 | 7/1940 | Tampier | 244/230 |
| 2,667,315 | 1/1954 | Watson et al. | 244/234 |
| 3,011,739 | 12/1961 | Boyce et al. | 244/83 |
| 4,069,720 | 1/1978 | Thor | 74/471 |
| 4,494,061 | 1/1985 | Kaye | 318/628 |
| 4,513,235 | 4/1985 | Acklam et al. | 318/685 |
| 4,516,063 | 5/1985 | Kaye et al. | 318/685 |
| 4,569,453 | 2/1986 | Oustad | 212/191 |
| 4,947,070 | 8/1990 | Hill | 244/223 |

OTHER PUBLICATIONS

European Search Report.

*Primary Examiner*—Joseph F. Peters, Jr.
*Assistant Examiner*—Linda L. Palomar
*Attorney, Agent, or Firm*—Nixon & Vanderhye

[57] ABSTRACT

Control apparatus, such as an aircraft throttle box, includes a manual control member 8 linearly movable on a first shaft 2. The position of the control member is sensed by rotation of the shaft 2 to generate an output control signal. In order to balance the apparatus, especially against high g-forces, a second shaft 3 is provided, parallel to the first carrying a counterweight 13 that moves together with the control member 8, but in the opposite direction.

5 Claims, 4 Drawing Sheets

CONTROL APPARATUS

BACKGROUND OF THE INVENTION

1. Field of the Invention

This invention relates to control apparatus, and in particular to apparatus for controlling an aircraft engine throttle (such apparatus being known as a "throttle box").

2. Discussion of Prior Art

A throttle box is known in which a control member is linearly movable upon a shaft to generate a control output signal to control the engine throttle opening. This movement may be effected either manually by a pilot or automatically when the aircraft is under the control of an autopilot. Such a throttle box is known, for example, from GB-A-2073887. Problems may occur, however, with such a throttle box when the aircraft experiences high g-forces. Forces of up to 10 g, which may be experienced for example when manoeuvring at high speeds, may cause the control member to move and produce an unwanted change in the throttle opening. Alternatively high g-forces may make it difficult for the pilot to move the control member if he does desire to change the throttle opening. Conventionally such a throttle box is disposed in the cockpit adjacent the pilot and arranged such that the control member moves in a fore-aft direction. Thus the throttle box is particularly susceptible to fore-aft acceleration forces.

SUMMARY OF THE INVENTION

According to the present invention there is provided control apparatus charaterised in that it comprises a control member linearly movable on a first shaft, and means for detecting the position of said control member relative to said first shaft and generating an output control signal in response thereto, and further comprising a second shaft parallel to said first shaft and having linearly movable thereon a counterweight, said shafts being coupled and driven together such that movement of said control member causes said counterweight to move with, but in the opposite direction to, said control member.

By means of this arrangement the above mentioned problems are overcome, or at least mitigated, by the provision of the balancing counterweight.

In a preferred embodiment the control member and the counterweight are both threadably mounted on their respective shafts through ball screws, and said shafts are able to rotate in synchronism, but in opposite senses, by drive gearing. In such an embodiment, in an autopilot mode the shafts may be driven by a motor through said gearing to move the control member to give the pilot a visual indication of the throttle opening selected by the autopilot. In a manual mode the pilot may move the control member and cause the two shafts to rotate. The position of the control member on its shaft represents engine throttle demand and may be detected by means measuring the amount of rotation of one or other of the shafts with respect to a datum. Such rotation may be detected to produce an output signal to an engine control unit.

In a preferred arrangement the counterweight may also be employed to operate additional control means, for example a microswitch, by its movement so that, say, the engine may not be started until the control member has moved to a given position. In addition a locking mechanism may be provided to lock the control member in a 'throttle off' position when desired.

BRIEF DESCRIPTION OF THE DRAWINGS

An embodiment of the invention will now be described by way of example and with reference to the accompanying drawings, in which.

DESCRIPTION OF THE PREFERRED EMBODIMENTS

Figure 1:
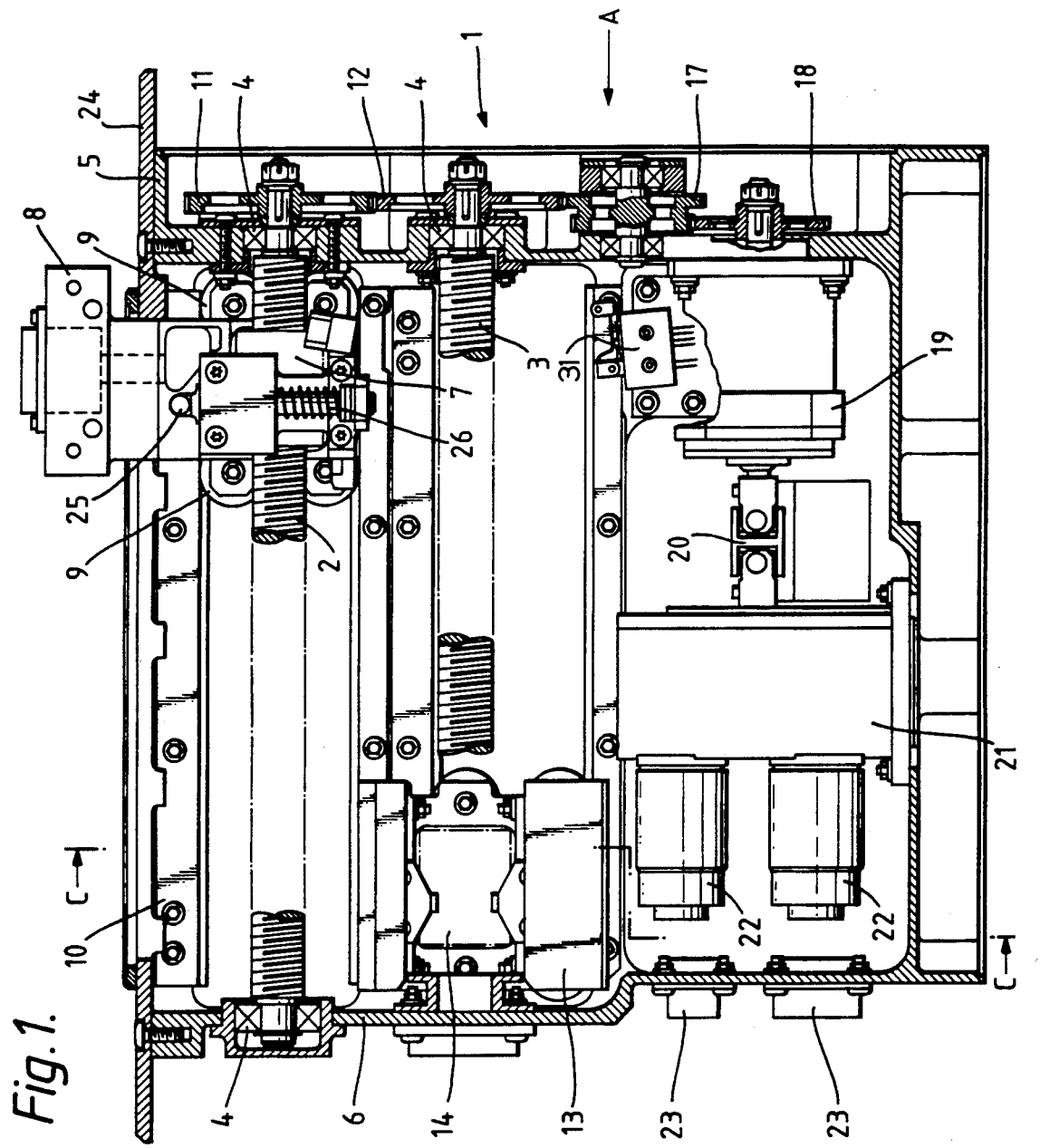
FIG. 1 is a section through a throttle box viewed from one side.
Figure 2:
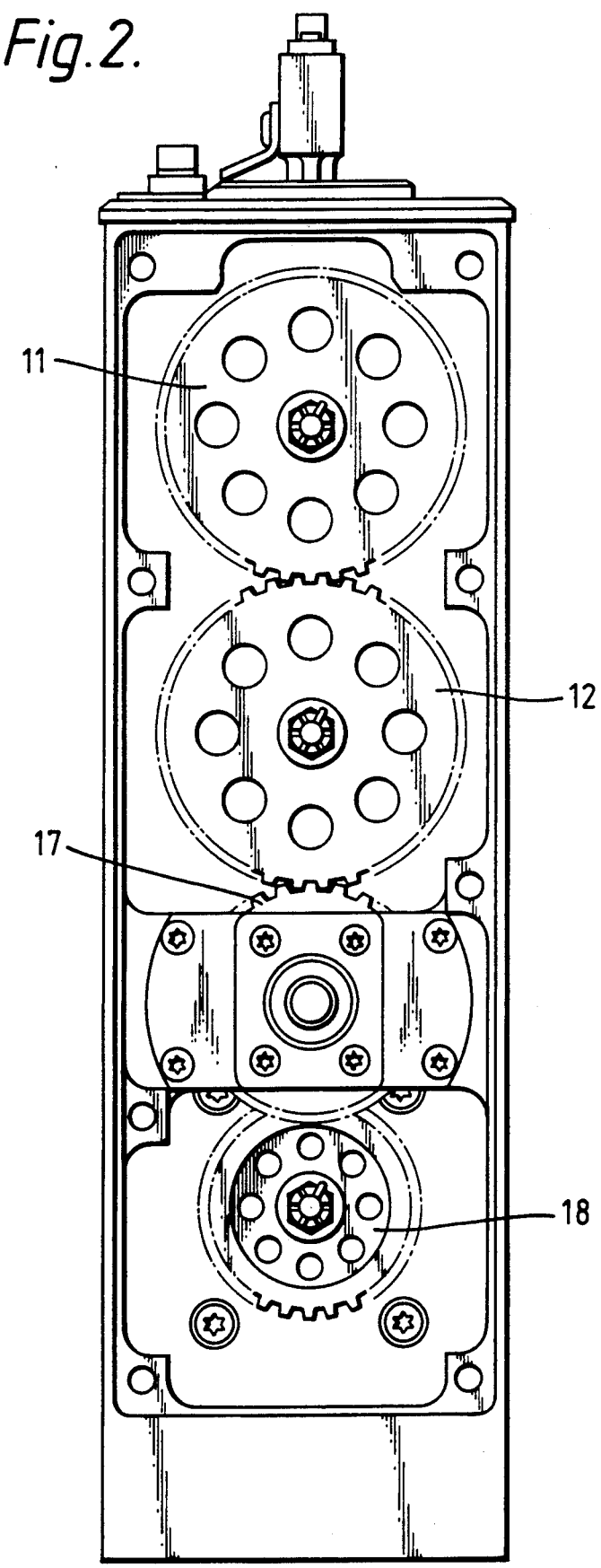
FIG. 2 is an end view of the throttle box in the direction of arrow A, of FIG. 1.

Referring firstly to FIG. 1 there is shown a throttle box designated generally by reference numeral 1. The overall form of the throttle box is that of a box generally square when viewed side on, but relatively short in a direction normal to FIG. 1. The throttle box 1 includes first and second threaded shafts 2, 3 rotatably mounted in bearings 4 formed in end walls 5, 6 of the box 1. The threads of the shafts 2 and 3 are identical in size, sense and pitch. The first shaft 2 carries, through a trunnion mounted ball nut 7, a control member 8 which is guided for linear movement along shaft 2 by four wheels 9 rotatably fitted to the control member 8 and running along tracks 10 bolted to the interior side wall of the throttle box. The throttle box is located within the aircraft cockpit adjacent the pilots seat and such that the shafts 2 and 3 are substantially parallel to the fore and aft axis of the aircraft.

The control member 8 includes a handle (not shown) by means of which the control member may be moved along the shaft 2 by a pilot. It will be appreciated that by virtue of the threaded mounting of the control member 8 on shaft 2, as the control member is moved linearly the shaft 2 is caused to rotate in bearings 4. This rotation of shaft 2 is transmitted to a parallel second shaft 3 below through meshing identical gears 11, 12 fixed to the ends of the two shafts 2, 3.

Figure 3:
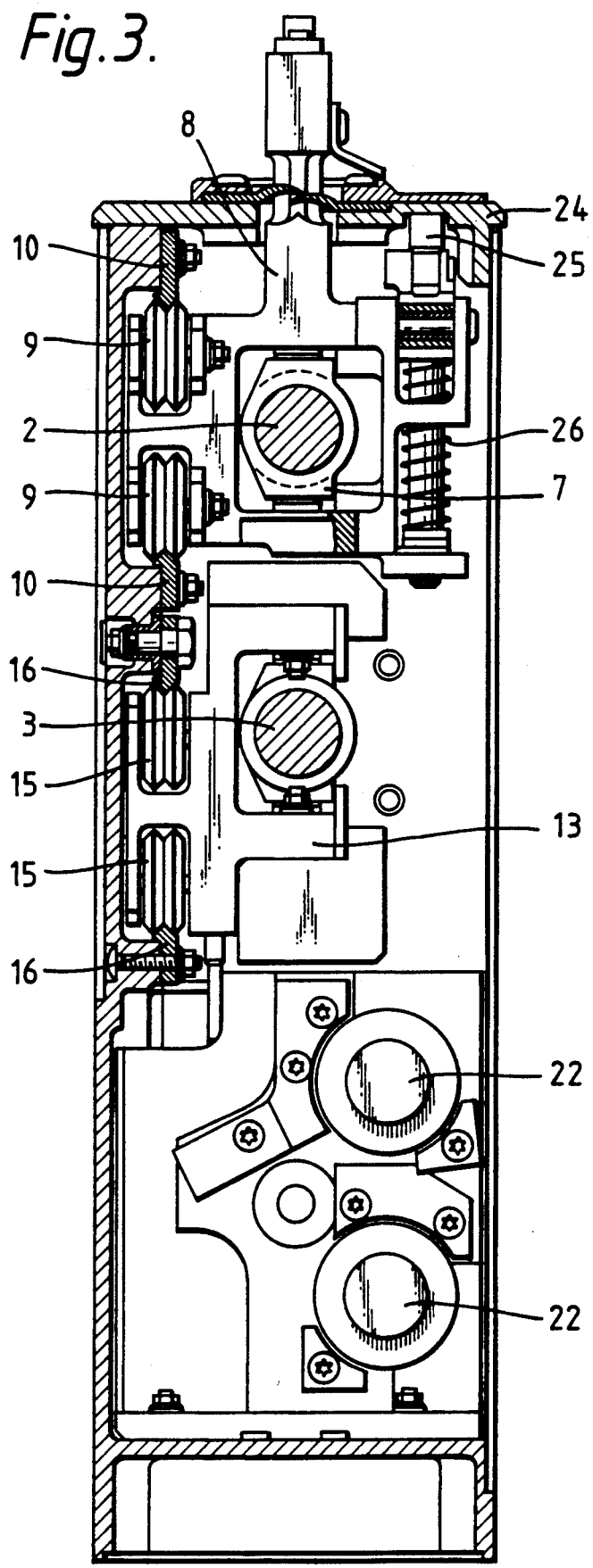
FIG. 3 is a section along line C—C of FIG. 1.

The second shaft 3 carries thereon a counterweight 13 of substantially identical weight to the control member 8. The counterweight is mounted through a similar ball nut 14 as the control member 8, and is guided for linear movement by a similar wheel 15 and track 16 arrangement (See FIG. 3). Since gears 11, 12, formed on the ends of shafts 2, 3 respectively, directly mesh with on another the two shafts will always rotate in opposite directions to one another, and since the thread on the two shafts is of the same sense, this means that the control member 8 and counterweight 13 will always move in linearly opposite directions, as will be discussed further below. The gears 11, 12 are linked, via an intermediate idler gear 17, to a further gear 18 provided at the end of an output shaft of a torque motor 19. The motor 19 is in turn linked by a flexible coupling 20 to a gearbox 21 and a pair of potentiometers 22 (providing a duplex electrical system) which produce output signals via output pins on sockets 23.

The ball screw assemblies 7, 14 are of a short length type as described in our co-pending application.

In a manual mode of operation, a pilot moves the control member 8 linearly to a desired position corresponding to a particular engine throttle setting. This linear motion of control member 8 causes rotation of shaft 2, and, through gearing 11, 12, 17, 18, rotation of shaft 3 and torque motor 19 (torque motor 19 could also be a stepper motor). The rotation of the torque motor 19 drives the gearbox 21 and potentiometers 22, to produce two output signals that are dependant on the position of the control member 8, and control the engine throttle opening by an electro mechanical servo system (not shown). At the same time, the counterweight 13 moves with the control member 8, but in the opposite direction, to balance the movement of the control member. For example, if the control member is urged by an acceleration force in a first direction, by means of the coupling between the two shafts the counterweight will be urged in the opposite direction. However, the counterweight itself will also be urged in the first direction by the acceleration force to resist movement of the counterweight and thus of the linked control member.

When an aircraft is being flown in an autopilot mode, the throttle box will receive, as an input to the torque motor, an electrical demand signal dependant on the throttle opening selected by an autopilot. Such an input signal causes the torque motor to rotate an amount dependant on the throttle opening demanded and such rotation of the torque motor will, through gearing 11, 12, 17, 18 cause shafts 2, 3 to rotate and, in particular, the control member 8 to move linearly. Thus, in an autopilot mode, the control member 8 will be moved automatically by the autopilot system to indicate to the pilot the throttle opening selected by the autopilot. Again, movement of the torque motor will cause rotation of the potentiometers and hence the transmission of demand signals to the electro-mechanical engine throttle servo mechanism.

Whether the throttle is being controlled manually or via an autopilot the action of g-forces in a direction parallel to the fore and aft axis of the aircraft on the control member 8 is opposed by their action on the counterweight 13, since movement of the control member in response to the g-forces would require the counterweight to move against those same forces.

The torque motor may also be employed if desired, to provide an artificial 'feel' or resistance to movement of the control member 8. Thus upon detecting movement of the control member 8 the torque motor 19 may be energised in such a sense as to urge the control member 8 in the opposite direction, though only of course to an extent that can be overcome by the pilot. Alternatively the torque motor 19 may be energised to resist movement of the control member 8 at selected points along shaft 2. In this way an electrical detent system may be provided to indicate to the pilot when the control member 8 passes selected points on shaft 2.

As an alternative, or in addition to, such an electrical detent system, a mechanical detent system may be provided as shown in the embodiment of the Figures. The top wall 24 of the throttle box may be provided with a track parallel to the shaft 2 and having cam regions at selected points therealong. Engaging this track is a cam follower 25 fixed to the side of the control member 8 and biassed into engagement with the track by a spring 26. When the cam follower 25 engages the cam regions of the track a degree of resistance will be felt by the pilot.

Figure 4:
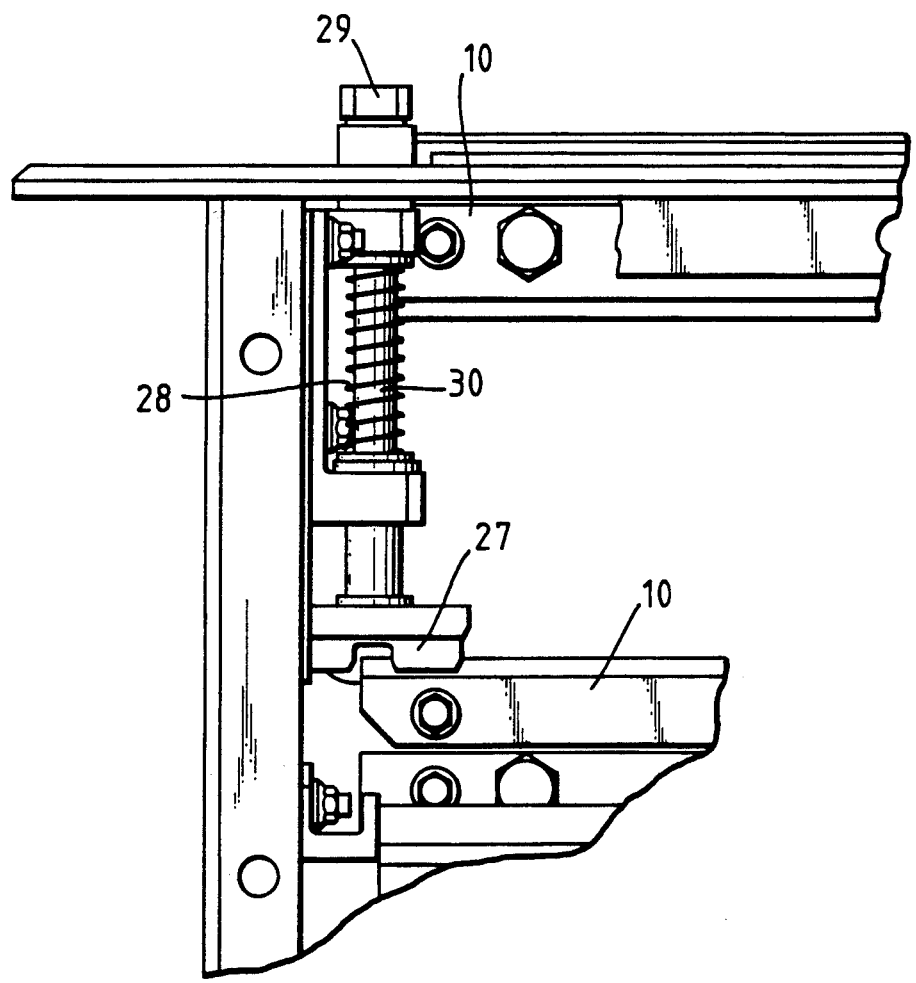
FIG. 4 is an enlarged detail of a locking mechanism of the throttle box of FIG. 1.

FIG. 4 shows a detail of the throttle box that is left out of FIG. 1 for clarity. Located in the top left-hand region of the throttle box, as viewed in FIG. 1, is a latching mechanism that may be used to lock the control member 8 in a "throttle off" position This mechanism comprises a latch member 27 that is downwardly biassed by spring 28 but which may be raised by pulling upwardly the head 29 of shaft 30 to which the latch member 27 is attached. To lock the control member 8 the latch member 27 is adapted to engage a corresponding recess (not shown) formed on the control member.

The counterweight 13 may also be used to sense the position of the control member. For example a microswitch 31 is provided that is operated by the counterweight 13 when it reaches the end of shaft 3 remote from the latching mechanism; that is to say the microswitch is operated when the control member 8 reaches its throttle closed position. This microswitch may be used in circuits to ensure that various functions cannot or can only (as the case may be) operate when the throttle is closed and the engine shut down.

We claim:

1. Control apparatus comprising a control member linearly moveable on a first shaft, and means for detecting the position of said control member on said first shaft and generating an output control signal in response thereto, further a second shaft parallel to said first shaft and having linearly movable thereon a counterweight said shafts being coupled and driven together such that movement of said control member causes said counterweight to move with, but in the opposite direction to, said control member wherein the control member and the counterweight are both threadably mounted on their respective shafts through ball screws and said shafts are able to rotate in synchronism, but in opposite senses by gearing associated with said shafts.

2. Apparatus according to claim 1 wherein the linear position of said control member is detected as a function of the rotation of said first shaft.

3. Apparatus according to claim 2 wherein said apparatus is operable in an automatic mode in which a torque motor drivingly associated with said gearing causes said first shaft to rotate, and said control member to move linearly thereon, to indicate the value of a control signal automatically generated.

4. Control apparatus comprising a control member linearly moveable on a first shaft, and means for detecting the position of said control member on said first shaft and generating an output control signal in response thereto, further a second shaft parallel to said first shaft and having linearly movable thereon a counterweight said shafts being coupled and driven together such that movement of said control member causes said counterweight to move with, but in the opposite direction to, said control member wherein the position of the counterweight is detected, at least at certain locations, to generate an additional output signal.

5. Control apparatus comprising a control member linearly moveable on a first shaft, and means for detecting the position of said control member on said first shaft and generating an output control signal in response thereto, further a second shaft parallel to said first shaft and having linearly movable thereon a counterweight said shafts being coupled and driven together such that movement of said control member causes said counterweight to move with, but in the opposite direction to, said control member wherein a locking mechanism is provided to lock the control member in given position.

* * * * *